United States Patent
Wu et al.

(10) Patent No.: US 10,146,702 B2
(45) Date of Patent: Dec. 4, 2018

(54) MEMCACHED SYSTEMS HAVING LOCAL CACHES

(71) Applicant: Intel Corporation, Santa Clara, CA (US)

(72) Inventors: Xiangbin Wu, Beijing (CN); Gansha Wu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 35 days.

(21) Appl. No.: 14/911,353

(22) PCT Filed: Mar. 9, 2015

(86) PCT No.: PCT/CN2015/073852
§ 371 (c)(1),
(2) Date: Feb. 10, 2016

(87) PCT Pub. No.: WO2016/141522
PCT Pub. Date: Sep. 15, 2016

(65) Prior Publication Data
US 2017/0039145 A1    Feb. 9, 2017

(51) Int. Cl.
*H04L 9/14*       (2006.01)
*G06F 12/14*      (2006.01)
*G06F 17/30*      (2006.01)
*G06F 12/0813*    (2016.01)
*H04L 9/32*       (2006.01)
(Continued)

(52) U.S. Cl.
CPC ...... *G06F 12/1408* (2013.01); *G06F 12/0813* (2013.01); *G06F 12/1466* (2013.01); *G06F 17/30902* (2013.01); *H04L 9/14* (2013.01);
*H04L 9/3226* (2013.01); *H04L 63/06* (2013.01); *G06F 2212/1052* (2013.01);
(Continued)

(58) Field of Classification Search
USPC ........ 713/162, 150, 163, 181; 726/2, 21, 36; 380/255, 264, 276
See application file for complete search history.

(56) References Cited

U.S. PATENT DOCUMENTS 8,667,012 B2 * 3/2014 Fuchs ............... G06F 17/30958
                                                707/770
8,898,186 B2   11/2014 Jagota et al.
(Continued)

FOREIGN PATENT DOCUMENTS

CN            102917036 A     2/2013

OTHER PUBLICATIONS

International Search Report and Written Opinion dated Nov. 3, 2015 for International Application No. PCT/CN2015/073852, 12 pages.

*Primary Examiner* — Sharif E Ullah
(74) *Attorney, Agent, or Firm* — Schwabe, Williamson & Wyatt, P.C.

(57) ABSTRACT

Apparatuses, methods and storage medium associated with a memcached system are disclosed herewith. In embodiments, a server apparatus may include memory; one or more processors; a network interface card to support remote memory direct access of the memory, by a client device, for a value of a key using an address that is a morph address of a physical address of a storage location of the memory having the value; and server side memcached logic operated by the one or more processors. Other embodiments may be described and/or claimed.

10 Claims, 9 Drawing Sheets

(51) Int. Cl.
*H04L 29/06* (2006.01)
*H04L 29/08* (2006.01)

(52) U.S. Cl.
CPC .... *G06F 2212/402* (2013.01); *G06F 2212/60* (2013.01); *H04L 67/2842* (2013.01); *H04L 67/42* (2013.01)

(56) References Cited

U.S. PATENT DOCUMENTS

| | | |
|---|---|---|
| 2012/0331084 A1 | 12/2012 | Chang et al. |
| 2014/0019686 A1* | 1/2014 | Dong ................ G06F 12/0864 711/128 |
| 2014/0325160 A1 | 10/2014 | Lim et al. |
| 2015/0178243 A1* | 6/2015 | Lowery ................ G06F 3/0619 709/212 |
| 2015/0227316 A1* | 8/2015 | Warfield ............... G06F 3/0611 711/103 |
| 2016/0112254 A1* | 4/2016 | Levy-Abegnoli ........................... H04L 41/0803 709/220 |

\* cited by examiner

MEMCACHED SYSTEMS HAVING LOCAL CACHES

CROSS REFERENCE TO RELATED APPLICATIONS

The present application is a national phase entry under 35 U.S.C. § 371 of International Application No. PCT/CN2015/073852, filed Mar. 9, 2015, entitled "MEMCACHED SYSTEMS HAVING LOCAL CACHES." The Specification of the PCT/CN2015/073852 Application is hereby incorporated by reference.

TECHNICAL FIELD

The present disclosure relates to the field of data processing. More particularly, the present disclosure relates to distributed memory cache systems (hereinafter, memcached systems) with local caches.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In computing, memcached is a general-purpose distributed memory caching system. It is often used to speed up dynamic database-driven websites by caching data and objects in random access memory (RAM) to reduce the number of times an external data source (such as a database) must be read. Most systems use a client-server architecture that includes multiple clients and servers. The servers maintain a key-value associative array; the clients populate this array and query it. Clients use client-side libraries to contact the servers. Each client knows all servers; the servers typically do not communicate with each other. If a client wishes to set or read the value corresponding to a certain key, the client's library first computes a hash of the key to determine the server to use. Then it contacts that server. The server will compute a second hash of the key to determine where to store or read the corresponding value. Typically, the servers keep the values in RAM; if a server runs out of RAM, it discards the oldest values.

For large web applications, e.g., web applications with millions of users, hundred of memcached servers may be necessary to timely service the page requests. To meet business requirements, the service operator not only needs to provide a total memory size as large as possible to meet desired service level agreements (SLA), but also needs a lot of CPU power to handle the memory access requests, which often includes GET, SET, UPDATE, among others.

Due to the CPU limitations, a memcached server typically cannot fully utilize the physical capacity of the implementing memories. Instead, operators need to spread load across multiple memcached servers to achieve expected load balance and thus SLAs. This leads to at least two problems: 1) poor memory bandwidth usage; and 2) poor scalability. Also, due to heavy CPU involvement, overhead for each memory access is high. This leads to poor power efficiency per every Key-Value pair access. Thirdly, access pattern for memcached is usually highly random, that makes CPU caching for data stored in memcached almost useless, but a waste of cycles and power.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
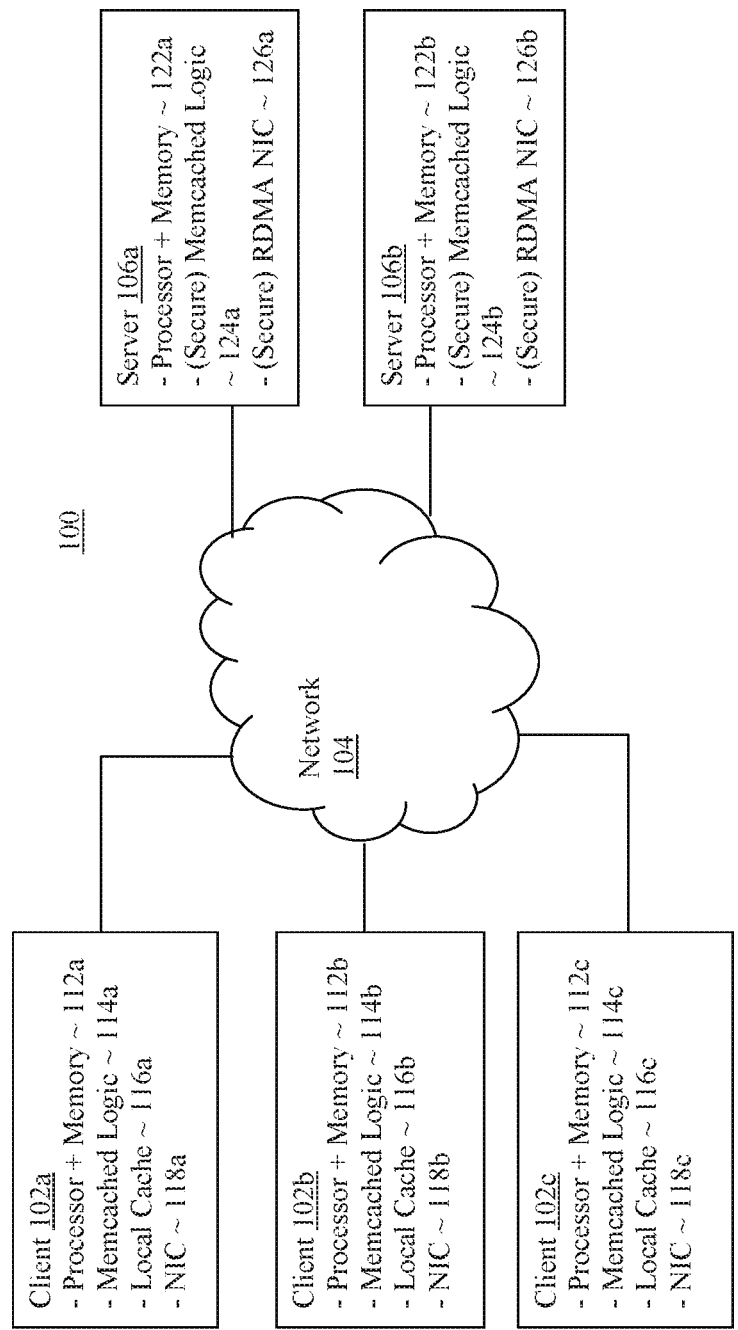
FIG. 1 is a block diagram showing a computing arrangement with a memcached system having local caches, according to the disclosed embodiments.

Apparatuses, methods and storage medium associated with a memcached system having local caches are disclosed herewith. In embodiments, a server apparatus may include memory; one or more processors; a network interface card to support remote memory direct access of the memory, by a client device, for a value of a key using an address that is a morph address of a physical address of a storage location of the memory; and server side memcached logic operated by the one or more processors. In embodiments, the server side memcached logic may be configured to receive a request to Get a value corresponding to a key in the memcached system, determine whether the Get request is valid, determine, on determination that the Get request is valid, whether the key results in a hit, and in response to the key resulting in a hit, return one or more morph addresses of one or more storage locations of the memcached system where the value and a status flag associated with the value are stored.

In embodiments, the memcached logic may be further configured to receive a request to Update a second key in the memcached system with a second corresponding value, determine whether the Update request is valid, determine, on determination that the Update request is valid, whether the second key results in a hit, and in response to the second key resulting in a hit, update a second status flag associated with a first item that yields the hit for the second key with a stale status, add the first item to a collect list, create a second item for the second key, and assign the second item with the second value. In embodiments, the memcached logic may be configured to encrypt the second value before storing the second value.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein a block diagram showing a computing arrangement with a memcached system having local caches, according to the disclosed embodiments, is illustrated. As shown, computing arrangement 100 with the memcached system may include a number of client devices 102a-102c and a number of servers 106a-106b coupled with each other through network 104. Each client device 102a, 102b or 102c may include corresponding processor and memory 112a, 112b or 112c, client side memcached logic 114a, 114b, or 114c, local caches 116a, 116b or 116c, and network interface cards (NIC) 118a, 118b or 118c. Whereas, each server 106a or 106b may include corresponding processor and memory 122a or 122b, server side memcached logic 124a, or 124b, and remote direct memory access (RDMA) NIC 126a or 126b. In embodiments, server side memcached logic 124a, or 124b, and remote direct memory access (RDMA) NIC 126a or 126b may optionally include various security features. Optional security features may be included when enhanced security is desired. Together, client side memcached logic 114a, 114b, and 114c, (secure) server side memcached logic 124a and 124b, and (secure) RDMA NIC 126a and 126b may implement a (secure) memcached system with local caches 116a, 116b, and 116c, providing potential advantages over existing memcached systems. The operation flows of client side memcached logic 114a, 114b, and 114c, and (secure) server side memcached logic 124a and 124b, including the usage and maintenance of local caches 116a, 116b and 116c, as well as usage of NICs 118a-118c and (secure) RDMA NICs 126a-126b (in particular, when direct access of the memcached system is made, bypassing memcached logic 124a and 124b), will be described in more detail below.

Except for client side memcached logic 114a, 114b, or 114c, and the instantiations of local cache 116a, 116b or 116c, client device 102a, 102b or 102c is intended to represent a broad range of computing devices known in the art, including but are not limited, smartphones, computing tablets, ultrabooks, laptops, desktop computers or servers, available from Apple Computers of Cupertino, Calif., Hewlett Packard of Palo Alto, Calif., and so forth. Thus, processor and memory 112a-112c and NICs 118a-118c may be any one of a number of these elements known in the art.

Similarly, except for (secure) server memcached logic 124a or 124b, and (secure) RDMA NICs 126a-126b (endowed with security features), server 106a or 106b is intended to represent a broad range of computing devices known in the art, including but are not limited, servers available from Dell Computer of Austin, Tex., IBM of Armonk, N.Y., and so forth. While for ease of understanding, computing arrangement 100 is illustrated and being described with three client devices 102a, 102b and 102c, and two servers 106a and 106b, the disclosure is not so limited. In embodiment, computing arrangement 100 may include any number of client devices and any number of servers. Thus, processor and memory 122a-122c and RDMA NICs 126a-126b (except for their security features) may be any one of a number of these elements known in the art.

Network 104 may include one or more wired and/or wireless, local and/or wide area, public and/or private networks known in the art. Each of the networks may include one or more routers, switches, gateways and/or other networking devices.

Figure 2:
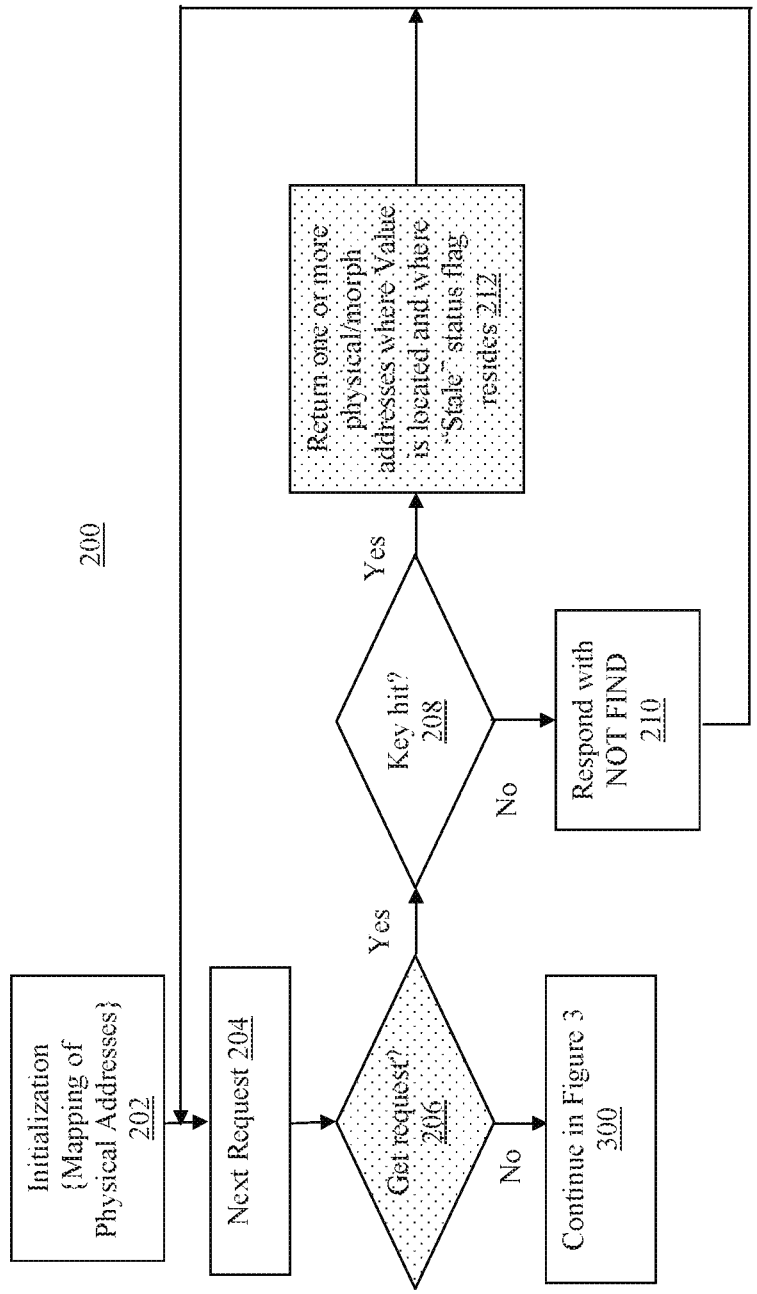
FIGS. 2-4 are flow diagrams illustrating various operation flows of the memcached logic on a server, according to the disclosed embodiments.
Figure 3:
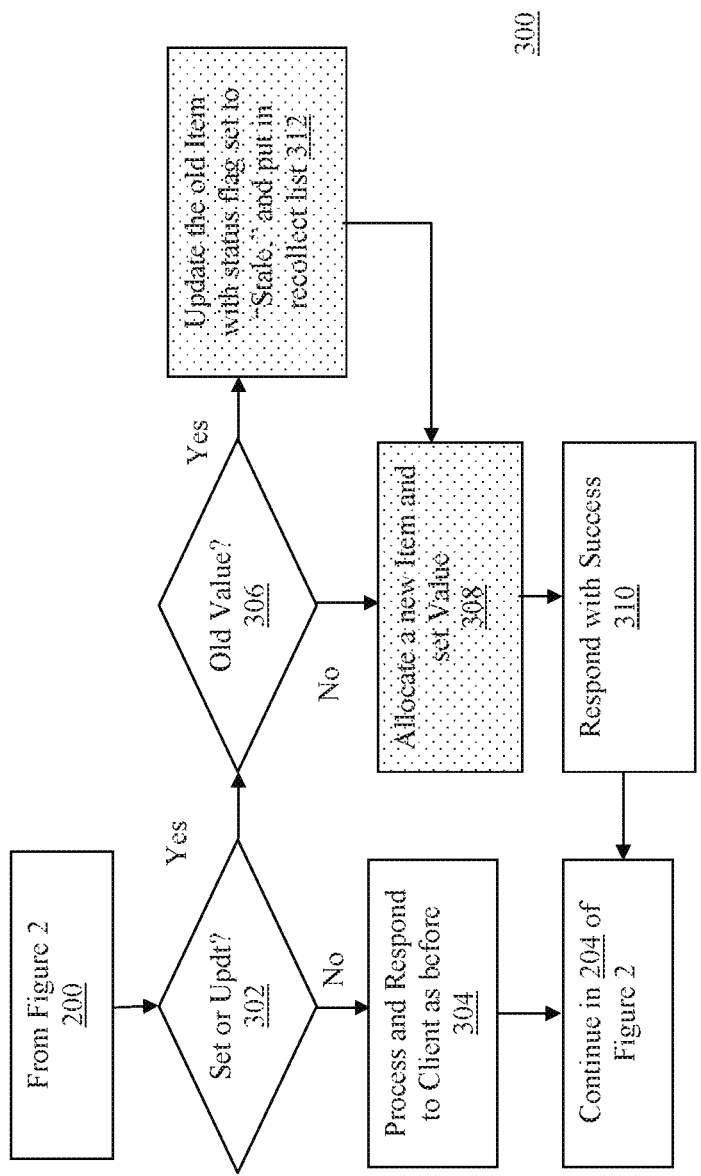
Figure 4:
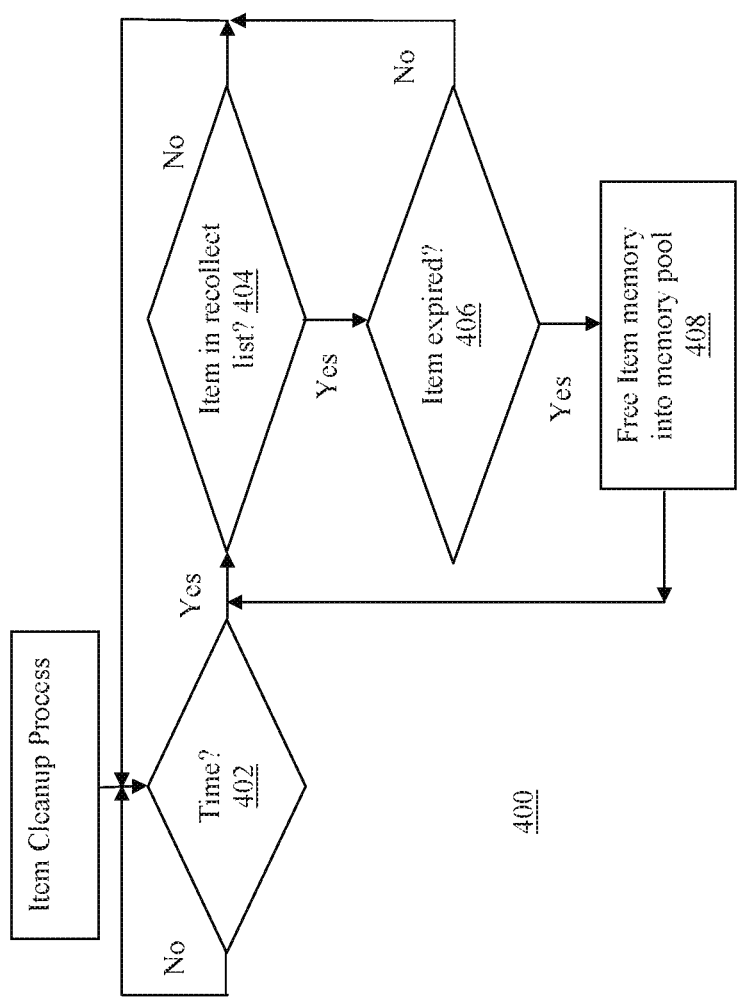
Figure 11:
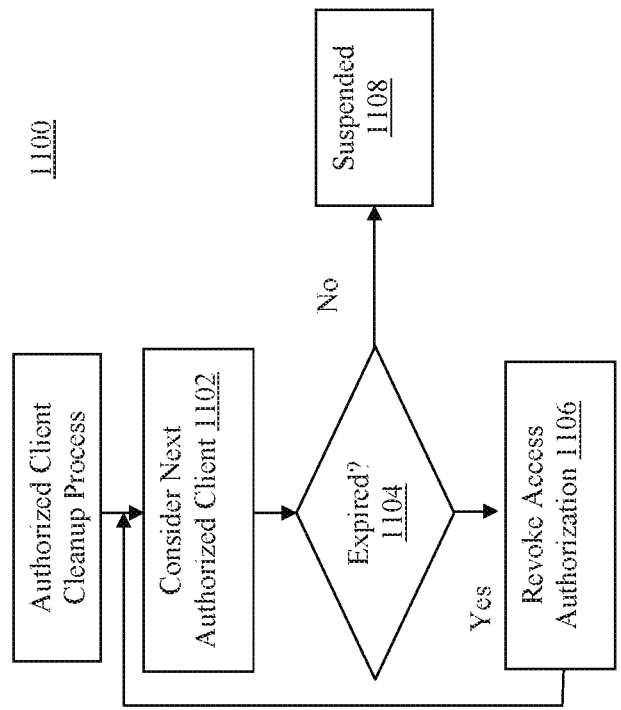
FIG. 11 illustrates an example process for cleaning up expired clients by the server, in accordance with the disclosed embodiments.
Figure 10:
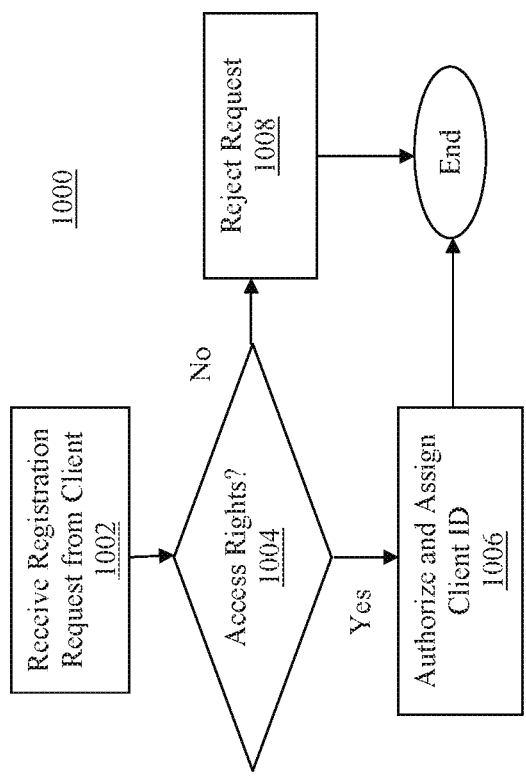
FIG. 10 illustrates an example process for registering clients by the server, in accordance with the disclosed embodiments.

Referring now to FIGS. 2-4, wherein three flow diagrams illustrating various operations flows of the (secure) memcached logic on a server, according to the disclosed embodiments, are shown. Before describing these various operation flows with references to FIGS. 2-4, references are also made to FIGS. 10-11, where two flow diagrams illustrating various operations flows of a secure implementation of server memcached logic 124a-124b for registering clients, and for cleaning up clients with expired registrations, according to the disclosed embodiments, are shown. In these embodiments, client registrations expire after elapse of a time period. As illustrated, process 1000 for registering clients 102a-102c (for the secure implementation of memcached system 100) may include operations performed at blocks 1002-1008, whereas process 1100 for cleaning up expired clients 102a-102c may include operations performed at blocks 1102-1108.

Process 1000 may start at block 1002. At block 1002, registration request may be received from a client with desire to use the memcached system. Next at block 1004, a determination may be made on whether the client is to be accorded rights to access the memcached system. In embodiments, the determination may be made with references to one or more local or remote access control lists.

Next at block 1006, on determination that the client has rights to access the memcached system, in embodiments, a unique client identifier (UID) is determined, assigned and provided to the client (for use with subsequent accesses). In embodiments, the UID may be determined (computed), e.g., by hashing the client's Internet Protocol (IP) address, together with a server generated random number. Further, the UID may have associated with it a valid time period (after which, the UID expires), and the UID is enlisted to the tail of an expiration list of client UIDs. Still further, a validation mechanism may be updated to enable operational validation when the client uses the UID to access the memcached system. In embodiments, the validation mechanism may comprise a bloom filter, and the bloom filer may be updated with the newly generated/assigned client UID.

Back at block 1004, if a result of the determination indicates that the client does not have access right to the memcached system, at block 1008, the request may be rejected, and the rejection may be logged.

Process 1100 may be performed periodically, and when performed, it may start at block 1102. At block 1102, a next authorized client to be examined may be obtained. In embodiments, the authorized client may be obtained from the earlier described expiration list of registered clients. Next at block 1104, the associated expiration time of the obtained client may be examined. If a result of the examination indicates that the valid time period has expired, the access authorization may be revoked. In embodiments, the revocation may include updating the validation mechanism employed during operation. In embodiments, updating the validation mechanism employed during operation may include updating a bloom filter removing the expired client UID. On the other hand, if a result of the examination indicates that the valid time period has not expired, at block 1108, performance of process 110 may be suspended (until the next periodic performance time).

Referring now to FIGS. 2-4, the operation flows of (secure) server side memcached logic 124a or 124b may include processes 200 and 300 to service various requests, and process 400 to maintain the server. The operation flow may start at block 202 where (secure) server side memcached logic 124a or 124b may go through a typical server initialization process of a memcached system. However, under the present disclosure, unlike existing memcached systems, during the initialization process, server side memcached logic 124a or 124b may map the physical addresses of its memory 122a or 122b into the address space of the memcached system. The potential advantage of mapping physical addresses, as opposed to virtual addresses, will be described later.

Next at block 204, server side memcached logic 124a or 124b may receive and begin service of a request from a client 102a, 102b or 102c. [As alluded to earlier, and will be described in more detail later, in subsequent requests, client 102a, 102b or 102c may directly access the memcached system via (secure) RDMA NICs 126a-126b for values associated with various keys, bypassing (secure) server side memcached logic 124a or 124b.] At block 206, on receipt of a request, server side memcached logic 124a or 124b may first determine whether the received request is a Get request to get a value corresponding to a key in the memcached system. If it is a Get request, the operation flow may continue at block 208, where server side memcached logic 124a or 124b may determine whether the key results in a hit.

In a secure implementation of server side memcached logic 124a or 124b, prior to determining whether the received request is a Get request to get a value corresponding to a key in the memcached system, a determination may also be made on whether the request is a request from an authorized (registered) client. In embodiments, the validation may include checking a validation mechanism, such as a Bloom filter, to confirm that the request is from an authorized/registered client. If the result of the determination indicates the request is not from an authorized/registered client, the request may be rejected, and the rejection may be logged.

On determination that the request is from an authorized (registered) client, and the request is a Get request, process 200 may proceed to block 208. At block 208, a determination may be made on whether the key results in a hit. In embodiments, a key results in a hit when the corresponding value of the key is stored in one or more storage locations. The one or more storage locations may be identified by corresponding physical addresses.

If a result of the determination indicates that the key does not result in a hit, the operation flow may continue at block 210, where server side memcached logic 124a or 124b may respond, e.g., with a message indicating the requested value for the key is not found. Thereafter, the operation flow may continue back at block 204, as earlier described.

However, if at block 208, a result of the determination indicates that the key results in a hit, the operation flow may continue at block 212, where server side memcached logic 124a or 124b may (in lieu of returning the requested value) return to the requesting client 102a, 102b, or 102c one or more physical addresses of the one or more storage locations of the memcached system where the corresponding value of the key, and an associated status flag indicating whether the value is stale or not, are stored. What follows after client device 102a, 102b, or 102c on receipt of the one or more physical addresses will be described later when the operation flows of client devices 102a, 102b, or 102c is described with references to FIG. 5-7. In embodiments, a physical address of the storage location of the corresponding value, and an address for the associated status flag are returned. In other embodiments, one physical address for a storage location where the corresponding value and the associated status flag are co-located is returned.

In alternate secure embodiments, in lieu of returning the physical address(es), the physical address(es) may be transformed or morphed into transformed/morph address(es) of a sparse address space, and return to client device 102a, 102b, or 102c. In other words, to enhance security of the memcached system, physical addresses of the memcached system are not exposed to client devices 102a, 102b and 102c. Only transformed/morph addresses (hereinafter, simply morph addresses) of the sparse address space are exposed to client devices 102a, 102b and 102c.

Figure 12:
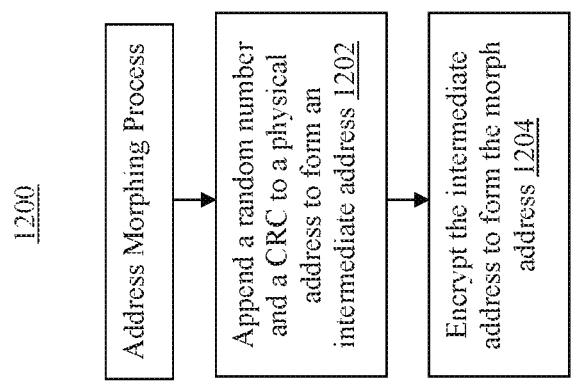
FIG. 12 illustrates an example process for generating a morph address, in accordance with the disclosed embodiments.

Referring now also to FIG. 12, wherein an example process for generating a morph address, in accordance with the disclosed embodiments, is shown. As illustrated, process 1200 for generating a morph address may start at block 1202. At block 1202, an intermediate address may first be created for a physical address, by appending a random number and a cyclic redundancy check (CRC) number to the physical address. For example, for a 42 bit physical address, a 128 bit intermediate address may be created by appending a 70 bit random number and a 16 bit CRC to the 42 bit physical address. Next, at block 1204, the intermediate address may be encrypted using a secret encryption key to generate a morph address of the same length.

Referring to FIGS. 2-4 again, back at block 206, if the request is from an authorized/registered client, but a result of the determination indicates that the request is not a Get request, the operation flow may continue in FIG. 3, starting at block 302. At block 302, a determination may be made on whether the request is a Set or Update request. If a result of the determination indicates that the request is neither a Set nor an Update request, the request may be processed and serviced as in existing memcached systems. Thereafter, the operation flow may continue back at block 204 of FIG. 2, as earlier described.

On the other hand, if a result of the determination at block 302 indicates that it is a Set or Update request, the operation flow may continue at block 306. At block 306, a determination may be made on whether an old corresponding value exists for the key of the Set or Update request. If a result of the determination at block 306 indicates that no old corresponding value exists for the key of the Set or Update request, the operation flow may continue at block 308, where a new item may be allocated in the memcached system for the key, and the item may be assigned with the value provided by the Set or Update request. Next, at block 310, a response may be made to the request, e.g., with a message indicating the Set or Update request has been successfully completed. From block 310, the operation flow may continue at block 204 of FIG. 2 as earlier described.

Back at block 306, if a result of the determination at block 306 indicates that an old corresponding value exists for the key of the Set or Update request, the operation flow may continue at block 312, where server side memcached logic 124a or 124b may update a status flag associated with the key to reflect the old corresponding value as stale. Further, server side memcached logic 124a or 124b may add the item having the key and the old corresponding value onto a recollect list, to enable the memory allocated for the item to be subsequently recovered. In embodiments, the recollect list may be a first-in-first-out list. From block 312, the operation flow may continue at block 308 as earlier described.

Additionally, in a secure implementation of the memcached system, server side memcached logic 124a or 124b may be further provided with the security feature of securing the values stored in the memcached system. In embodiments, the values may be secured through encryption prior to storing the values. Thus, for these embodiments, both blocks 308 and 312 may further include the encryption operation, encrypting the new or replacement value before the new/replacement value is stored for the new item or replaces the old item value.

In addition to the above operation flow to service a Get, a Set or an Update request, server side memcached logic 124a or 124b may also periodically perform maintenance process 400 (also referred to as a cleanup process) to recover memory allocated to items with values marked as "stale." Process 400 may start at block 402 where server side memcached logic 124a or 124b awaits the time to perform the maintenance process. Process 400 may continuously loop at block 402 until it is time to perform maintenance process 400. At such time, process 400 may continue at block 404. At block 404, server side memcached logic 124a or 124b may determine where any item has been added to the recollect list. If a result of the determination indicates that the recollect list is empty, meaning no item has their value marked stale since the last maintenance, process 400 may go to sleep, that is, return to block 402 and await the next point in time when maintenance is to be performed.

On the other hand, if it is determined at block 404 that the recollect list is not empty, meaning one or more items with stale values have been added, process 400 may continue at block 406. At block 406, server side memcached logic 124a or 124b may examine the next item in the recollect list, and determine whether the next item has expired. Expiration may be determined e.g., based on the amount of lapse time since the time when it is put into the recollect list. If the next item has not expired, for the illustrated embodiment where the recollect list is a first-in-first-out list, process 400 may also go to sleep, that is, return to block 402 and await the next point in time when maintenance is to be performed, as earlier described. In alternate embodiments, where the recollect list is not a first-in-first-out list, process 400 may return to block 404, and continue there from, as earlier described, instead.

On the other hand, if it is determined at block 406 that the examined item has expired, next at block 408, server side memcached logic 124a or 124b may free the memory allocated to the expired item back into the memory pool for reuse. Thereafter, process 400 may return to block 404, and continue as earlier described. The operations at blocks 404-408 may be repeated until no item in the recollect list is expired. On processing all items that are expired in the recollect list, process 400 may return to block 402, and continue therefrom as earlier described.

Figure 5:
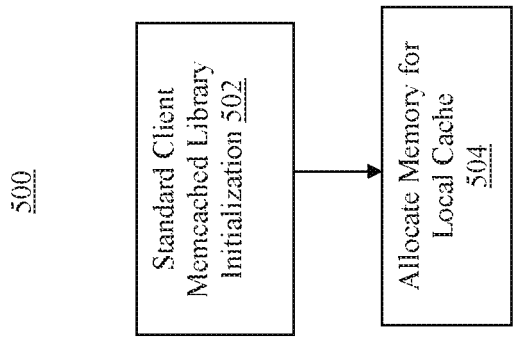
FIGS. 5-7 are flow diagrams illustrating various operation flows of the memcached logic on a client, according to the disclosed embodiments.
Figures 6, 7:
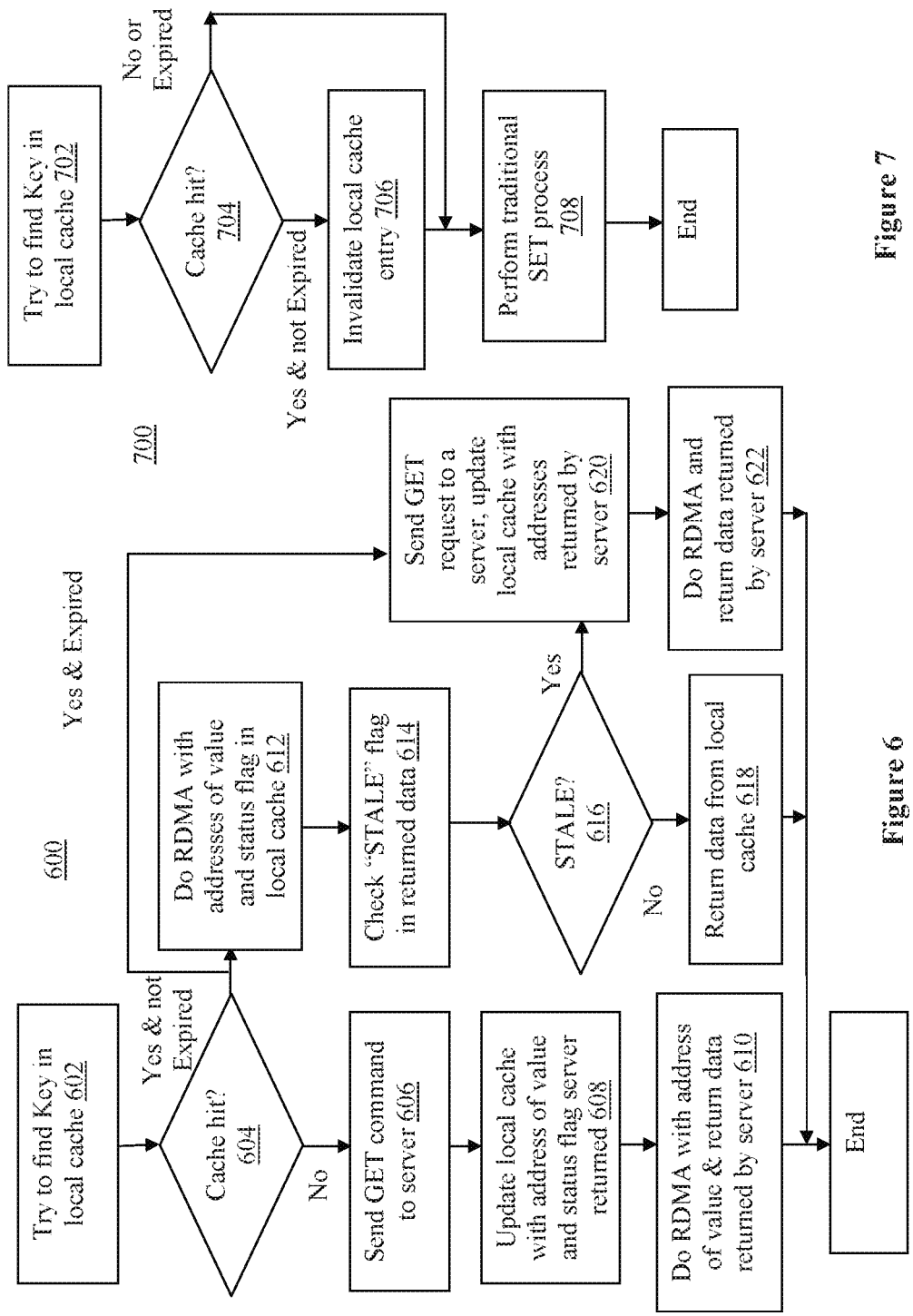

Referring now to FIGS. 5-7, wherein three flow diagrams illustrating various operations flows of the memcached logic on a client, according to the disclosed embodiments, are shown. As illustrated, the operation flows of client side memcached logic 114a, 114b or 114c may include initialization process 500, process 600 to service a Get request, and process 700 to service a Set request.

Initialization process 500 may begin at block 502 of FIG. 5, where client side memcachced logic 114a, 114b or 114c may initialize itself on startup, as in existing memcached systems. However, for the disclosed embodiments, next at block 504, client side memcached logic 114a, 114b or 114c may allocate a block of the local memory to be used as local cache 116a, 116b or 116c.

Process 600 to service a Get request may start at block 602, where client side memcached logic 114a, 114b or 114c may try to locate a key of a Get request in local cache 116a, 116b or 116c. If the key does not result in a cache hit (or simply, hit), at block 606, client side memcached logic 114a, 114b or 114c may send the Get request to a server of the memcached system, as in existing memcached systems. In response, as described earlier, unlike existing memcached systems, client side memcached logic 114a, 114b or 114c, at block 608, may receive one or more physical addresses (or morph addresses, for secure implementations) of one or more storage locations of the memcached system where the corresponding value of the key and the associated "stale" status flag are stored. Client side memcached logic 114a, 114b or 114c then cached the returned one or more physical/morph addresses of the one or more storage locations of the memcached system where the corresponding value of the key and the associated "stale" status flag are stored. Next, at block 610, client side memcached logic 114a, 114b or 114c may perform a RDMA operation using the physical/morph address of the value returned, and retrieve the corresponding value of the key. Thereafter, client side memcached logic 114a, 114b or 114c may return the retrieved value to the requestor of the Get request. From block 610, process 600 may end.

In secure implementations of the memcached system, as alluded earlier, RDMA NICs 126a-126b of servers 106a and 106b may be provided with security features. In particular, secure RDMA NICs 126a-126b may be provided with the hardware to check whether the Get request is from an authorized/registered client. In embodiments, secure RDMA NICs 126a-126b may be provided with hardware to check the same validation mechanism, such as the Bloom filter, employed by secure memcached logic 124a-124b.

Figure 13:
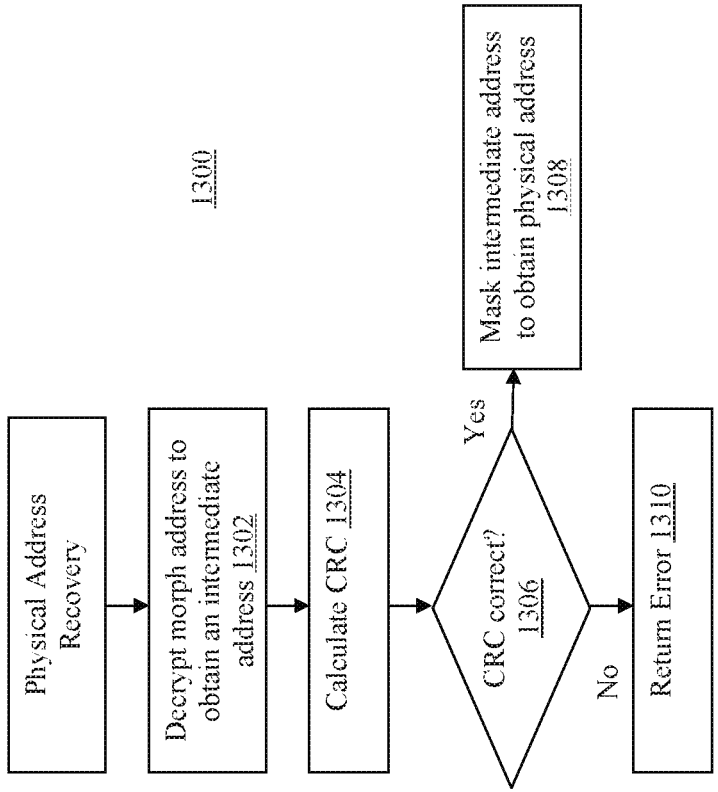
FIG. 13 illustrates an example process for recovering a physical address from a morph address, in accordance with the disclosed embodiments.

Further, for secure embodiments that employ morph addresses, secure RDMA NICs 126a-126b may further be provided with hardware to recover the physical address(es) from the morph addresses. Referring now also to FIG. 13, wherein a block diagram illustrating a process for recovering physical address, in accordance with various embodiments is shown. As illustrated, process 1300 for recovering a physical address from a morph address may include operations performed at blocks 1302-1310. Process 1300 may start at block 1302. At block 1302, a morph address may be decrypted using a corresponding secret decryption key to recover the intermediate address. Next at block 1304, a CRC value may be calculated. Then, at block 1306, the calculated CRC value may be compared with the CRC portion of the recovered intermediate address. If the comparison is unsuccessful, e.g. the CRC values do not match, an error may be returned at block 1310. On the other hand, if the comparison is successful, e.g. the CRC values match, the intermediate address may be masked to recover the physical address, e.g. for morph address generated as earlier described with references to FIG. 12, the lower order bits may be masked to recover the 42 bit physical addresses.

Further, for secure embodiments where secure memcached logic 124a-124b are additionally provided with the security feature of encrypting the item values before they are stored, secure RDMA NICs 126a-126b may further be provided with the corresponding decryption hardware to decrypt the encrypted item values before returning the retrieved item values to client 102a-102c.

Note that by virtue of the nature of a RDMA operation, server side memcached logic 124a or 124b is not cognizant of the RDMA operation when client 102a, 102b or 102c retrieves the value, and thus the processors of servers 106a or 106b are not involved in servicing the actual retrieval of the corresponding values of the keys. In other words, under the present disclosure, processors of servers 106a or 106b will no longer be the bottle necks, constraining the amount of memory of server 106a or 106b Accordingly, under the present disclosure, it is expected, a much larger amount of memory, as compared to existing memcached systems, may be configured on each server 106a or 106b. In turn, compared to existing memcached systems, less servers 106a or 106b may be needed for an application, and the present disclosure, especially coupled with direct use of physical addresses in RDMA (in lieu of virtual addresses) may be more efficient and scalable. Further, due to the significant lower usage of the processors, servers 106a and 106b may consume a lot less power, and more energy efficient, when compared to existing memcached systems.

Still referring to FIG. 6, on the other hand, if a result of the determination at block 604 indicates the key results in a hit, process 600 may proceed to block 612. At block 612, memcached logic 114a, 114b or 114c may determine if the cache entry that yields the hit is expired. If the cache entry that yields the hit has not expired, memcached logic 114a, 114b or 114c may perform a RDMA operation using the one or more physical/morph addresses of the value and the associated status flag stored in the cache entry that yields the cache hit, and retrieve the corresponding value of the key and the associated status flag. Expiration of a cache entry may be determined e.g., by comparing current system time with the time when the one or more addresses were retrieved from a memcached server. If the time difference is larger than a configured value, the cache entry may be determined as expired. Next at blocks 614-616, memcached logic 114a, 114b or 114c may check the status flag to determine if the retrieved value is stale. If it is determined at block 616 that the retrieved value is not stale, at block 618, memcached logic 114a, 114b or 114c may return the retrieved value to the requestor of the Get request. From block 618, process 600 may end.

However, if it is determined at block 612 that the cache entry that yields the hit has expired, or at block 616 that the retrieved value is stale, process 600 may continue at block 620. At block 620, memcached logic 114a, 114b or 114c may send the Get request to a server of the memcached system as in existing memcached systems. As described earlier, unlike existing memcached systems, at block 620, memcached logic 114a, 114b or 114c may receive, in response, one or more physical/morph addresses of one or more storage locations of the memcached system where the corresponding value of the key and the associated status flag are stored. As described earlier for similar receipt, memcached logic 114a, 114b or 114c may update local cache 116a, 116b or 116c, store the returned one or more physical/morph addresses in a new cache entry in local cache 116a, 116b or 116c, and invalidate the prior cache entry that yields the cache hit. In alternate embodiments, memcached logic 114a, 114b or 114c may update the prior cache entry that yields the cache hit instead. Next, at block 622, memcached logic 114a, 114b or 114c may perform an RDMA operation using the returned physical/morph address of the value to retrieve the value as earlier discussed, and return the retrieved value to the requestor of the Get request. From block 622, process 600 may end.

Similarly, process 700 to service a Set request may begin at block 702, where memcached logic 114a, 114b or 114c may try to locate a key of a Set request in local cache 116a, 116b or 116c. If the key does result in a cache hit (or simply, hit) and is not expired, at block 706, memcached logic 114a, 114b or 114c may invalidate the cache entry that yields the cache hit, then proceed to block 708, else process 700 proceeds directly to block 708. At block 708 memcached logic 114a, 114b or 114c may process and service the Set request as in existing memcached systems. From block 708, process 700 may end.

Figure 8:
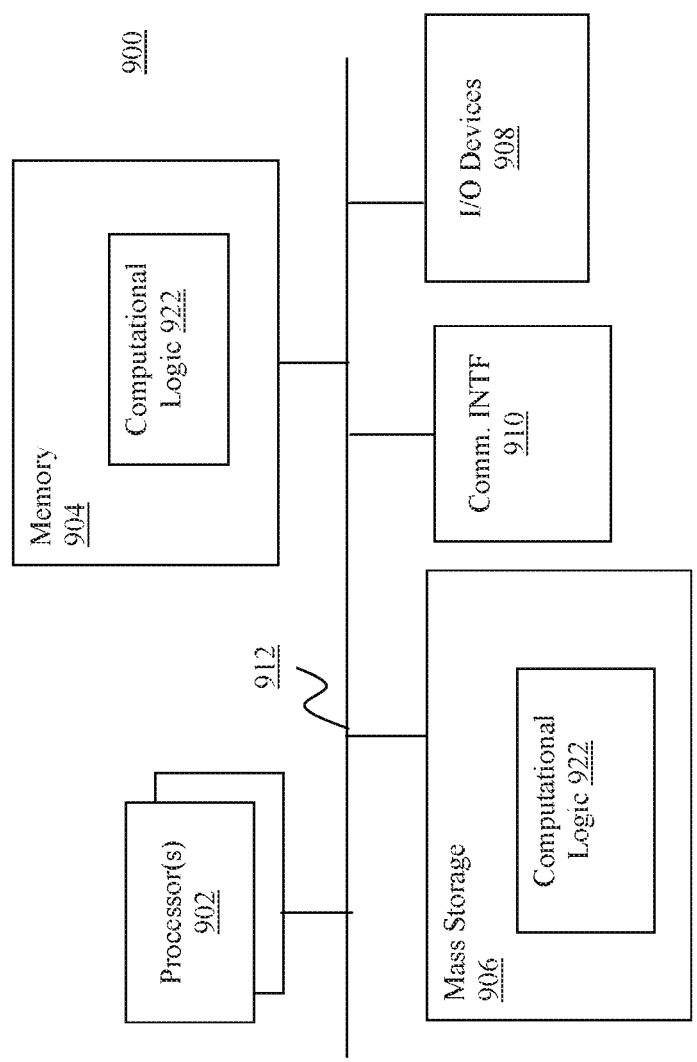
FIG. 8 illustrates an example computer system suitable for use to practice various aspects of the present disclosure, according to the disclosed embodiments.

FIG. 8 illustrates an example computer system that may be suitable for use as a client device or a server to practice selected aspects of the present disclosure. As shown, computer 900 may include one or more processors or processor cores 902, and system memory 904. For the purpose of this application, including the claims, the terms "processor" and "processor cores" may be considered synonymous, unless the context clearly requires otherwise. Additionally, computer 900 may include mass storage devices 906 (such as diskette, hard drive, compact disc read only memory (CD-ROM) and so forth), input/output devices 908 (such as display, keyboard, cursor control and so forth) and communication interfaces 910 (such as network interface cards, modems and so forth). The elements may be coupled to each other via system bus 912, which may represent one or more buses. In the case of multiple buses, they may be bridged by one or more bus bridges (not shown).

Each of these elements may perform its conventional functions known in the art. In particular, system memory 904 and mass storage devices 906 may be employed to store a working copy and a permanent copy of the programming instructions implementing the client or server side memcached logic 114a, 114b, 114c, 124a or 124b, earlier described, collectively referred to as computational logic 922. The various elements may be implemented by assembler instructions supported by processor(s) 902 or high-level languages, such as, for example, C, that can be compiled into such instructions.

The number, capability and/or capacity of these elements 910-912 may vary, depending on whether computer 900 is used as a client device or a server. In particular, when use as client device, the capability and/or capacity of these elements 910-912 may vary, depending on whether the client device is a stationary or mobile device, like a smartphone, computing tablet, ultrabook or laptop. Otherwise, the constitutions of elements 910-912 are known, and accordingly will not be further described.

Figure 9:
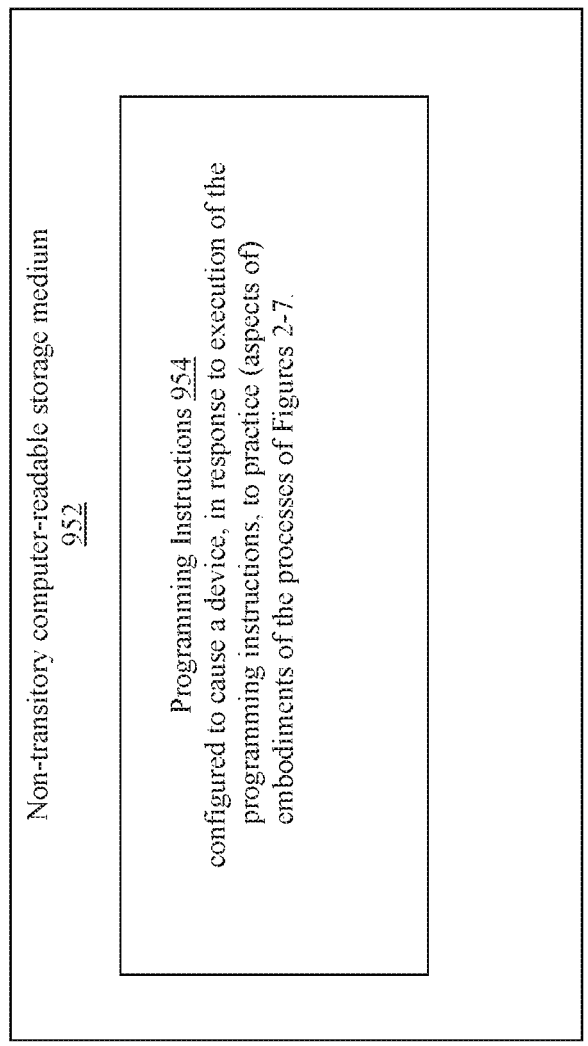
FIG. 9 illustrates a storage medium having instructions for practicing methods described with references to FIGS. 2-7, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 9 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 952 may include a number of programming instructions 954. Programming instructions 954 may be configured to enable a device, e.g., computer 900, in response to execution of the programming instructions, to perform, e.g., various operations associated with client or server side memcached logic 114a, 114b, 114c, 124a or 124b. In alternate embodiments, programming instructions 954 may be disposed on multiple computer-readable non-transitory storage media 952 instead. In alternate embodiments, programming instructions 954 may be disposed on computer-readable transitory storage media 952, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 9, for one embodiment, at least one of processors 902 may be packaged together with memory having computational logic 922 (in lieu of storing on memory 904 and storage 906). For one embodiment, at least one of processors 902 may be packaged together with memory having computational logic 922 to form a System in Package (SiP). For one embodiment, at least one of processors 902 may be integrated on the same die with memory having computational logic 922. For one embodiment, at least one of processors 802 may be packaged together with memory having computational logic 922 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be a server apparatus of a memcached system. The server apparatus may comprise memory; one or more processors coupled with the memory; a network interface card coupled to the memory to support remote memory direct access of the memory, by a client device, for a value of a key using an address that is a morph address of a physical address of a storage location of the memory having the value; and server side memcached logic operated by the one or more processors.

Example 2 may be example 1, wherein the network interface may support unmoprh of the morph address to recover the physical address.

Example 3 may be example 2, wherein the morph address may be generated through encryption of an intermediate address generated from the physical address; and wherein the network interface may unmoprh the morph address to recover the physical address through decryption of the morph address to recover the intermediate address.

Example 4 may be example 3, wherein the intermediate address may be generated from concatenation of the physical address with a random number and a cyclic redundancy check value; and wherein the network interface may recover the physical address through computation of a cyclic redundancy check value to compare against the cyclic redundancy check portion of the intermediate address, and unmask a portion of the intermediate address to recover the physical address on successful cycle redundancy check comparison.

Example 5 may be example 1, wherein the network interface may further validate whether the client device is authorized to access the memcached system.

Example 6 may be example 5, wherein the network interface may validate whether the client device is authorized to access the memcached system through check of a bloom filter.

Example 7 may be example 1, wherein the value of the key may be encrypted when stored in the memory, and the network interface is to further decrypt the encrypted value on retrieval from the memory prior to transmission to the client device.

Example 8 may be any one of examples 1-7, wherein the client device, the request, the value, the key, the status flag, the physical address, the storage location, and the morph address are first client device, first request, first value, first key, first status flag, first physical address, first storage location, and first morph address respectively; and wherein the memcached logic may be operated by the one or more processors to: receive a second request, from a second client device, to Get a second value corresponding to a second key in the memcached system; determine whether the second client device is authorized to access the memcached system; and service the second request on determination that the second client device is authorized to access the memcached system.

Example 9 may be example 8, wherein the memcached logic may be further operated by the one or more processors to register the first and second client devices, and on registration of the first and second client device, update a bloom filter used during operation to validate client devices to reflect registration of the first and second client devices; wherein the memcached logic is to check the bloom filter to determine whether the second client device is authorized to access the memcached system.

Example 10 may be example 8, wherein the memcached logic may be further operated by the one or more processors to: determine, on a determination that the second client device is authorized to access the memcached system, whether the second key results in a hit, and in response to the second key results in a hit, return one or more second morph addresses morphed from one or more second physical addresses of one or more storage locations of the memcached system where the second value and a second status flag associated with the second value are stored.

Example 11 may be example 10, wherein the memcached logic may generate the second morph address through initial generation of an intermediate address through concatenation of the second physical address with a random number and a cyclic redundancy check value; and then encryption of the intermediate address.

Example 12 may be example 8, wherein the memcached logic may further receive a third request from a third client device to Update a third key in the memcached system with a third corresponding value; determine whether the third client device is authorized to access the memcached system; determine, on determination that the third client device is authorized to access the memcached system, whether the third key results in a hit; and in response to the third key results in a hit, update a third status flag associated with a first item that yields the hit for the third key with a stale status, add the first item to a collect list, create a second item for the third key, and assign the second item with the third value.

Example 13 may be a method for memory caching data. The method may comprise: receiving, by memcached logic of a server of a memcached system, from a client device, a request to Get a value corresponding to a key; determining, by the memcached logic, whether the client device is authorized to access the memcached system; and servicing, by the memcached logic, the request, on determining the client device is authorized to access the memcached system.

Example 14 may be example 13, further comprising registering, by the memcached logic, the client device, and on registration of the client device, update a bloom filter used during operation to validate client devices to reflect registration of the client device; wherein determining whether the client device is authorized to access the memcached system may comprise checking the bloom filter to determine whether the client device is authorized to access the memcached system Example 15 may be example 13, wherein servicing may comprise determining whether the key results in a hit, and in response to the key results in a hit, returning one or more morph addresses of one or more physical addresses of one or more storage locations of the memcached system where the value and a status flag associated with the value are stored.

Example 16 may be example 15, wherein returning may comprise generating the one or more morph addresses.

Example 17 may be example 16, wherein generating a morph address may comprise initially generating an intermediate address by concatenating a physical address with a random number and a cyclic redundancy check value; and then encrypting the intermediate address.

Example 18 may be any one of examples 13-17, further comprising: receiving, by the memcached logic, from a second client device, a second request to Update a second key in the memcached system with a second corresponding value; determining, by the memcached logic, whether the second client device is authorized to access the memcached system; and servicing, by the memcached logic, the second request, on determining the second client device is authorized to access the memcached system.

Example 19 may be example 18, wherein servicing the second request may comprise: determining whether the second key results in a hit; and in response to the second key results in a hit, updating a second status flag associated with a first item that yields the hit for the second key with a stale status, adding the first item to a collect list, creating a second item for the second key, and assigning the second item with the second value.

Example 20 may be example 19, wherein assigning the second item with the second value may comprise encrypting the second value, and storing the encrypted second value.

Example 21 may be one or more storage medium comprising a plurality of instructions, in response to execution of the instructions by a server apparatus, to cause the server apparatus to receive a request, from a client device, to Get a value corresponding to a key in the memcached system; determine whether the client device is authorized to access the memcached system; and service the request on determination that the client device is authorized to access the memcached system.

Example 22 may be example 21, wherein the server apparatus may be further operated by the one or more processors to register the client device, and on registration of the client device, update a bloom filter used during operation to validate client devices to reflect registration of the client device; wherein the server apparatus may be further caused to check the bloom filter to determine whether the client device is authorized to access the memcached system.

Example 23 may be example 21, wherein the server apparatus may be further caused to: determine, on a determination that the client device is authorized to access the memcached system, whether the key results in a hit, and in response to the key results in a hit, return one or more morph addresses morphed from one or more physical addresses of one or more storage locations of the memcached system where the value and a status flag associated with the value are stored.

Example 24 may be example 23, wherein the server apparatus is further caused to generate the morph address through initial generation of an intermediate address through concatenation of the physical address with a random number and a cyclic redundancy check value; and then encryption of the intermediate address.

Example 25 may be any one of examples 21-24, wherein the server apparatus is further caused to: receive a second request from a second client device to Update a second key in the memcached system with a second corresponding value; determine whether the second client device is authorized to access the memcached system; determine, on determination that the second client device is authorized to access the memcached system, whether the second key results in a hit; and in response to the third key results in a hit, update a second status flag associated with a first item that yields the hit for the second key with a stale status, add the first item to a collect list, create a second item for the second key, and assign the second item with the second value.

Example 26 may be a server apparatus of a distributed memory cache system. The server apparatus may comprise: means for receiving from a client device a request to Get an value corresponding to a key; means for determining whether the client device is authorized to access the distributed memory cache system; and means for servicing, the request, on determining the client device is authorized to access the distributed memory cache system.

Example 27 may be example 26, further comprising means for registering the client device; and means for updating a bloom filter used during operation to validate client devices, on registration of the client device, to reflect registration of the client device; wherein means for determining whether the client device is authorized to access the distributed memory cache system may comprise means for checking the bloom filter to determine whether the client device is authorized to access the distributed memory cache system.

Example 28 may be example 26, wherein means for servicing comprising: means for determining whether the key results in a hit, and means for returning, in response to the key results in a hit, one or more morph addresses of one or more physical addresses of one or more storage locations of the distributed memory cache system where the value and a status flag associated with the value are stored.

Example 29 may be example 28, wherein means for returning may comprise means generating the one or more morph addresses.

Example 30 may be example 29, wherein means for generating a morph address may comprise means for initially generating an intermediate address by concatenating a physical address with a random number and a cyclic redundancy check value; and means for encrypting the intermediate address to generate the morph address.

Example 31 may be any one of examples 26-30, further comprising: means for receiving, from a client device, a second request to Update a second key in the distributed memory cache system with a second corresponding value; means for determining whether the second client device is authorized to access the distributed memory cache system; and means for servicing the second request, on determining the second client device is authorized to access the distributed memory cache system.

Example 32 may be example 31, wherein means for servicing the second request may comprise: means for determining whether the second key results in a hit; and means for updating, in response to the second key results in a hit, a second status flag associated with a first item that yields the hit for the second key with a stale status, adding the first item to a collect list, creating a second item for the second key, and assigning the second item with the second value.

Example 33 may be example 32, wherein means for assigning the second item with the second value may comprise means for encrypting the second value, and means for storing the encrypted second value.

It will be apparent to those skilled in the art that various modifications and variations can be made in the disclosed embodiments of the disclosed device and associated methods for memcached without departing from the spirit or scope of the disclosure, including application to other caching applications, storage applications or appliances. Thus, it is intended that the present disclosure covers the modifications and variations of the embodiments disclosed above provided that the modifications and variations come within the scope of any claims and their equivalents.

What is claimed is:

1. A server apparatus of a memcached system, comprising: memory;
   one or more processors coupled with the memory;
   a network interface card coupled to the memory to support remote memory direct access of the memory, by a client device, for a value of a key using an address that is a morph address of a physical address of a storage location of the memory having the value, wherein the physical address is one of a plurality of physical addresses of a first address space, and the morph address is one of a plurality of morph addresses of a different second address space, corresponding to the plurality of physical addresses of the first address space, the morph addresses being scattered in the second address space to secure the corresponding physical address; and wherein to support the remote memory direct access of the memory for the value of the key, wherein the network interface supports unmorphing of the morph address to recover the physical address; and
   server side memcached logic operated by the one or more processors;
   wherein the morph address is generated through encryption of an intermediate address generated from the physical address; and wherein the network interface unmorphs the morph address to recover the physical address through decryption of the morph address to recover the intermediate address.

2. The server apparatus of claim 1, wherein the intermediate
   address is generated from concatenation of the physical address with a random number and a
   cyclic redundancy check value; and wherein the network interface recovers the physical address through computation of the cyclic redundancy check value to compare against a cyclic redundancy check portion of the intermediate address, and unmask a portion of the intermediate address to recover the physical address on successful cycle redundancy check comparison.

3. The server apparatus of claim 1, wherein the network interface further validates whether the client device is authorized to access the memcached system.

4. The server apparatus of claim 3, wherein the network interface validates whether the client device is authorized to access the memcached system through check of a bloom filter.

5. The server apparatus of claim 1, wherein the value of the key is encrypted when stored in the memory, and the network interface further decrypts the encrypted value on retrieval from the memory prior to transmission to the client device.

6. The server apparatus of claim 1, wherein the client device, a request, the value, the key, a status flag, the physical address, the storage location, and the morph address are a first client device, a first request, a first value, a first key, a first status flag, a first physical address, a first storage location, and a first morph address respectively; and wherein the memcached logic is operated by the one or more processors to:
   receive a second request, from a second client device, to get a second value corresponding to a second key in the memcached system;
   determine whether the second client device is authorized to access the memcached system; and
   service the second request on determination that the second client device is authorized to access the memcached system.

7. The server apparatus of claim 6, wherein the memcached logic is further operated by the one or more processors to register the first and second client devices, and on registration of the first and second client devices, update a bloom filter used
   during operation to validate client devices to reflect registration of the first and second client devices; wherein the memcached logic is to checks the bloom filter to determine whether the second client device is authorized to access the memcached system.

8. The server apparatus of claim 6, wherein the memcached logic is further operated by the one or more processors to:
   determine, on a determination that the second client device is authorized to access the memcached system, whether the second key results in a hit, and in response to the second key results in a hit, return one or more second morph addresses morphed from one or more second physical addresses of one or more storage locations of the memcached system where the second value and a second status flag associated with the second value are stored.

9. The server apparatus of claim 8, wherein the memcached logic generates the second morph address through initial generation of an intermediate address through concatenation of the second physical address with a random number and a cyclic redundancy check value; and then encryption of the intermediate address.

10. The server apparatus of claim 6, wherein the memcached logic is further to:
- receive a third request from a third client device to update a third key in the memcached system with a third corresponding value;
- determine whether the third client device is authorized to access the memcached system;
- determine, on determination that the third client device is authorized to access the memcached system, whether the third key results in a hit; and
- in response to the third key results in a hit, update a third status flag associated with a first item that yields the hit for the third key with a stale status, add the first item to a collect list, create a second item for the third key, and assign the second item with the third value.

* * * * *

UNITED STATES PATENT AND TRADEMARK OFFICE
CERTIFICATE OF CORRECTION

PATENT NO.        : 10,146,702 B2
APPLICATION NO.   : 14/911353
DATED             : December 4, 2018
INVENTOR(S)       : Xiangbin Wu et al.

Page 1 of 1

It is certified that error appears in the above-identified patent and that said Letters Patent is hereby corrected as shown below:

In the Claims

Column 18
Line 59, Claim 7 "…logic is to checks…" should read "…logic checks…"

Signed and Sealed this
Nineteenth Day of February, 2019

Andrei Iancu
*Director of the United States Patent and Trademark Office*